United States Patent
Wang et al.

(10) Patent No.: US 8,489,548 B2
(45) Date of Patent: Jul. 16, 2013

(54) METHOD, SYSTEM, AND DEVICE FOR DATA SYNCHRONIZATION

(75) Inventors: Rui Wang, Shenzhen (CN); Kepeng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 488 days.

(21) Appl. No.: 12/758,617

(22) Filed: Apr. 12, 2010

(65) Prior Publication Data

US 2010/0198783 A1    Aug. 5, 2010

Related U.S. Application Data

(63) Continuation of application No. PCT/CN2008/072567, filed on Sep. 27, 2008.

(30) Foreign Application Priority Data

Oct. 12, 2007 (CN) .......................... 2007 1 0182239

(51) Int. Cl.
    *G06F 17/30*      (2006.01)
(52) U.S. Cl.
    USPC ............................ 707/610; 707/698; 713/153
(58) Field of Classification Search
    USPC ................... 707/999.107, 999.202–999.204, 707/698, 747, 610, 611, 612; 713/105, 153; 705/901–912
See application file for complete search history.

(56) References Cited

U.S. PATENT DOCUMENTS

| | | | |
|---|---|---|---|
| 7,558,797 B2* | 7/2009 | Li | 1/1 |
| 7,747,584 B1* | 6/2010 | Jernigan, IV | 707/692 |
| 7,778,972 B1* | 8/2010 | Cormie et al. | 707/626 |
| 7,885,190 B1* | 2/2011 | Roesch et al. | 370/235 |
| 8,099,605 B1* | 1/2012 | Billsrom et al. | 713/187 |
| 2004/0025072 A1 | 2/2004 | Mau | |
| 2005/0015396 A1* | 1/2005 | Vu | 707/100 |
| 2006/0080427 A1 | 4/2006 | Yach et al. | |
| 2006/0222160 A1 | 10/2006 | Bank et al. | |
| 2007/0110089 A1* | 5/2007 | Essafi et al. | 370/420 |
| 2007/0276836 A1* | 11/2007 | Chatterjee et al. | 707/10 |
| 2008/0098042 A1* | 4/2008 | Tian et al. | 707/201 |
| 2009/0157802 A1* | 6/2009 | Kang et al. | 709/203 |
| 2010/0289627 A1* | 11/2010 | McAllister et al. | 340/10.42 |
| 2012/0096358 A1* | 4/2012 | Barnes, Jr. | 715/728 |

FOREIGN PATENT DOCUMENTS

| | | |
|---|---|---|
| CN | 1407475 A | 4/2003 |
| CN | 1691571 A | 11/2005 |
| CN | 1852137 A | 10/2006 |
| CN | 1010095516 A | 8/2007 |

(Continued)

OTHER PUBLICATIONS

1st Office Action in corresponding European Patent Application No. 08839217.0 (Jan. 16, 2012).

(Continued)

*Primary Examiner* — Leslie Wong

(57) ABSTRACT

A method for data synchronization (DS) is provided, which includes comparing data fingerprints in databases of two parties in need of DS, determining data that needs to be synchronized, and DS is then performed on the data that needs to be synchronized. A system and two devices for DS are further provided. Therefore, DS is implemented through data fingerprints in the technical solutions, thus avoiding transmitting a mass of data between the two parties in need of DS.

5 Claims, 11 Drawing Sheets

FOREIGN PATENT DOCUMENTS

| | | |
|---|---|---|
| CN | 101409614 B | 4/2011 |
| EP | 1564658 A1 | 8/2005 |
| EP | 1708096 A1 | 10/2006 |
| KR | 2006-0037403 A | 5/2006 |
| WO | WO 2005/029356 A2 | 3/2005 |
| WO | WO 2007/087746 A1 | 8/2007 |

OTHER PUBLICATIONS $2^{nd}$ Office Action in corresponding European Patent Application No. 08839217.0 (Jun. 15, 2012).

$1^{st}$ Office Action in corresponding Chinese Application No. 200710182239.5 (Aug. 13, 2010).

Written Opinion in corresponding PCT Application No. PCT/CN2008/072567 (Jan. 8, 2009).

Extended European Search Report in corresponding European Application No. 08839217.0 (Dec. 27, 2010).

Office Action in corresponding Korean Application No. 2010-7008496 (Jun. 27, 2011).

State Intellectual Property Office of the People'S Republic of China, International Search Report in International Patent Application No. PCT/CN2008/072567 (Jan. 8, 2009).

* cited by examiner

METHOD, SYSTEM, AND DEVICE FOR DATA SYNCHRONIZATION

CROSS-REFERENCE TO RELATED APPLICATIONS

This application is a continuation of International Application No. PCT/CN2008/072567, filed on Sep. 27, 2008, which claims priority to Chinese Patent Application No. 200710182239.5, filed on Oct. 12, 2007, both of which are hereby incorporated by reference in their entireties.

FIELD OF THE TECHNOLOGY

The present invention relates to the technical field of data communication, and more particularly to a method, system, and device for data synchronization.

BACKGROUND OF THE INVENTION

In the modern information society, with the development of information and communication technology, a user can receive and send information, and can execute applications in a terminal device through the device, anytime and anywhere. The data exchange and results of executing the applications need to be stored in the terminal device, and need to be kept consistent with the data of the same type in other terminal devices. For example, address books are saved in a mobile phone and a personal digital assistant (PDA), and the same address books are also saved in a personal computer (PC) or laptop at home or in the office. A user desires that information of the address books in the terminal devices is kept consistent, and once the data saved in any one of the devices is changed, the data in other devices should be changed accordingly. This process is referred to as data synchronization.

The objective of a universal data synchronization protocol is to be universally applicable, that is, both parties of the synchronization may be network devices of any type on any network, such as a handheld computer, a PDA, a mobile phone, an automatic computer, or a PC, and the data to be synchronized may be network data of any type. The synchronization markup language (SyncML) protocol is a universal standard designed to achieve the objective.

The SyncML protocol is a protocol set, which includes four parts, namely, the framework of the SyncML data synchronization protocol, the SyncML synchronization protocol, the SyncML representation protocol, and the SyncML transmission mode. The SyncML synchronization protocol defines the data processes in sessions of data synchronization operation, the handshake process between two parties of the synchronization, and types of data synchronization operation. The SyncML representation protocol describes data types supported in the synchronization, command formats, and SyncML message formats capable of being transmitted on various networks. A SyncML message can be transmitted on any wired or wireless network connection. The SyncML transmission mode defines that SyncML packets and messages can be transmitted on network connections based on the Hyper-Text Transfer Protocol (HTTP), the Wireless Session Protocol (WSP), and the Object Exchange Protocol (OBEX). The three transmission protocols cover most remote and shot-path connections. FIG. 1 is a structural view of the framework of the SyncML data synchronization protocol in the conventional art. In FIG. 1, the frame circled by dashed lines indicates the SyncML framework of the SyncML standard, and the blocks outside the frame circled by the dashed lines indicate the data synchronization protocol. The SyncML framework includes SyncML data formats, SyncML adapters, and SyncML functional interfaces.

In FIG. 1, an application A represents a network service, which is in data synchronization and exchange with some applications of other network devices, for example, an application B in FIG. 1. Public network connections such as HTTP, WSP, and OBEX may be used for a service of a data synchronization (DS) action between the application A and the application B. A "synchronization engine" is in charge of managing actions of the entire synchronization data. The DS action of the application A is based on a DS protocol and the "synchronization engine" is in charge of managing the entire action process. A "synchronization service agent" manages access of the "synchronization engine" to the network and mutual communication processes for the DS of applications on a client and a server. The "synchronization service agent" accomplishes the functions by invoking the "SyncML interface" or functions on the interface. The "SyncML interface" is an application interface for the "SyncML adapter". The "SyncML adapter" is in charge of processes of receiving and sending messages. In the processes, receiving and sending parties communicate with each other by receiving and sending SyncML format documents. The "SyncML adapter" creates and maintains a network connection between the application A and the application B at the same time. By invoking the functions of the "SyncML interface", the application B uses a "synchronization client agent" to access the network and its "SyncML adapter".

As can be seen from the foregoing description, in the SyncML protocol, DS is performed between each SyncML client requiring DS and the same SyncML server, thereby implementing the DS between respective SyncML clients.

FIG. 2 is a flow chart of DS between a server and a client in a SyncML protocol in the conventional art. As shown in FIG. 2, one SyncML synchronization process generally needs six packages. The synchronization process specifically includes the following steps.

In step 201, the client sends a synchronization initialization package PKG1 to the server.

No matter which party initiates the synchronization process, the client first sends the synchronization initialization package PKG1 to the server. The PKG1 mainly includes information such as client authentication information and device capability.

In step 202, after receiving the PKG1, the server verifies the client authentication information, and returns a verification result to the client through a synchronization-initialization response package PKG2.

In step 203, the client analyzes synchronization types specified in the PKG2, encapsulates all data in a local database that is changed after the previous synchronization, that is, the data that needs to be synchronized, into a PKG3, and sends the PKG3 to the server.

The data that is changed includes the data that is added, deleted, and replaced. In action logs of a local database, a location of a log after the previous synchronization is usually identified through the log identifier (ID), and the location is usually specified by an "Anchor" term. In such a manner, during next synchronization, data that needs to be synchronized to the server is the information recorded in the log after Anchor. Table 1 describes a format of reference log information.

TABLE 1

| Anchor | LUID | Action |
|--------|------|--------|
| 1110 | 555 | Add |
| 1111 | 168 | Replace |
| 1112 | 123 | Delete |
| 1113 | 556 | Add |

In Table 1, a local unique ID (LUID) is a unique ID corresponding to a certain piece of data in the terminal database. The value of LUID is assigned by a terminal.

In step 204, after receiving the PKG3, the server executes various action instructions in the PKG3, replaces the data in a corresponding database, and returns an instruction execution status to the client through a PKG4. At the same time, the server also encapsulates all data that is changed after the previous synchronization in its own database in the PKG4 and returns the PKG4 to the client.

In step 205, after receiving the PKG4, the client performs various action instructions in the PKG4, replaces the data in the local database, and returns an instruction execution status to the server through a PKG5.

If the PKG4 received by the client includes an add instruction of adding a data item in the local database, after the client successfully adds new data locally, the client needs to generate corresponding ID mapping information and notify the server of the corresponding ID mapping information through the PKG5.

Because the server database has a large capacity, a unique ID corresponding to a certain piece of data is different from a unique ID corresponding to the same data in the client database. To determine the same data item that needs to be operated by the client and the server, the server also needs to maintain a mapping table for associating the client database and the server database. Table 2 shows such mapping table.

TABLE 2

| Client Device Client Database: | |
|---|---|
| LUID | Data |
| 11 | Car |
| 22 | Bike |
| 33 | Truck |
| 44 | Shoes |

| Server Device Server Database: | |
|---|---|
| GUID | Data |
| 1010101 | Car |
| 2121212 | Bike |
| 3232323 | Truck |
| 4343434 | Shoes |

| Server Mapping Table: | |
|---|---|
| GUID | LUID |
| 1010101 | 11 |
| 2121212 | 22 |
| 3232323 | 33 |
| 4343434 | 44 |

In Table 2, a global unique ID (GUID) is a unique ID corresponding to a certain piece of data in the server database and the GUID is distributed by the server.

In step 206, after the server maintains the ID mapping information included in the PKG5 to the mapping table, the server returns a PKG6 to inform a client of an execution status of a maintenance instruction. After the client receives the PKG6, if all status codes in the PKG6 are normal, it indicates that the synchronization is successful, and the process is ended.

In the process shown in FIG. 2, the client and server usually determine whether the data is changed according to the Anchor and the actions that are performed. However, records of the Anchor and performed actions are replaced according to the synchronization command or after completing the modification indication of data. If the communication is interrupted during the process, if no synchronization response message is received, the Anchor and records of the performed actions may not match. This causes that the data that is changed is unable to be determined accurately. Based on such situation, a fingerprint technology emerges. A data item is able to be identified through a data fingerprint. For example, a fingerprint of a data item is obtained by digesting some data item. The fingerprint may be generated by the client only, or generated by the client and the server. The fingerprint is provided for the server to determine whether the data received by the terminal is the same as the data stored in the terminal, and further determine whether the data is changed. This is because that the fingerprints are inconsistent no matter the server or the client modifies the data.

The fingerprint action includes a unidirectional action and a bidirectional action. The unidirectional fingerprint action means that the client calculates and saves the fingerprint and sends the fingerprint to the server at the same time, and the server does not perform fingerprint action and only saves the fingerprint sent by the client. The bidirectional fingerprint action means that both the server and client calculate fingerprints and save separately the calculated fingerprints.

However, in the conventional art, it is mentioned only that the data fingerprint is able to be adapted to determine whether the data is changed, but no solution for implementing DS through the data fingerprint in the DS process is provided.

SUMMARY OF THE INVENTION

The present invention is directed to a method for data synchronization (DS), by using which, data fingerprints can be used to implement DS.

The present invention is further directed to a system for DS, which is able to use data fingerprints to implement DS.

The present invention is further directed to two types of devices for DS, which are able to use data fingerprints to implement DS.

To achieve the above objectives, the technical solutions of the present invention are implemented in the manners as follows.

The present invention provides a DS method, which includes the following steps.

Data fingerprints in the databases of two parties in need of DS are compared, and data that needs to be synchronized is determined.

The DS is performed on the determined data that needs to be synchronized.

The present invention provides a system for data synchronization (DS), which includes a first device and a second device in need of mutual DS.

The first device is adapted to send all data fingerprints in its database and corresponding data identifiers (IDs) to the second device, divide data that needs to be synchronized into data that needs to be synchronized due to modification by the first device and data that needs to be synchronized due to modification by the second device according to a change log in its database after receiving IDs of the data that needs to be synchronized sent by the second device, and send data that needs to be synchronized due to modification by the first device and corresponding data IDs to the second device.

The second device is adapted to compare data fingerprints in its own database and received data fingerprints according to the received data IDs, determine that data having inconsistent fingerprints is data that needs to be synchronized, send IDs of all data that needs to be synchronized to the first device, and synchronize data that needs to be synchronized due to modification of the first device received at the same time to the database of the second device according to the received data IDs.

The present invention provides a device for data synchronization (DS), which includes a determination module and a synchronization module.

The determination module is adapted to receive data fingerprints and corresponding data IDs sent by an opposite device, compare data fingerprints in the database of a device corresponding to the opposite device with the received data fingerprints from the opposite device according to the received data IDs, determine that data having inconsistent fingerprints is data that needs to be synchronized, and send IDs of all data that needs to be synchronized to the opposite device.

The synchronization module is adapted to receive data that needs to be synchronized due to modification by the opposite device sent by the opposite device and synchronize the received data in its own database.

The present invention further provides a device for data synchronization (DS), which includes a sending module and a division module.

The sending module is adapted to send all data fingerprints and corresponding data IDs in a database of its own device for DS to an opposite device.

The division module is adapted to receive IDs of data that needs to be synchronized sent by the opposite device, divide data that needs to be synchronized into data that needs to be synchronized due to modification by its own device and data that needs to be synchronized due to modification by the opposite device according to a change log in the database of its own device, and send the data that needs to be synchronized due to modification by its own device and corresponding data IDs to the opposite device.

As can be seen from the foregoing technical solutions, for the present invention, the data fingerprints in databases of the two parties in need of DS are compared, the data that needs to be synchronized is determined, and the DS is performed on the data that needs to be synchronized. In the technical solutions of the present invention, the data fingerprints are used to implement the DS, thus avoiding transmitting a mass of data between the two parties in need of DS.

DETAILED DESCRIPTION OF THE EMBODIMENTS

Figure 1:
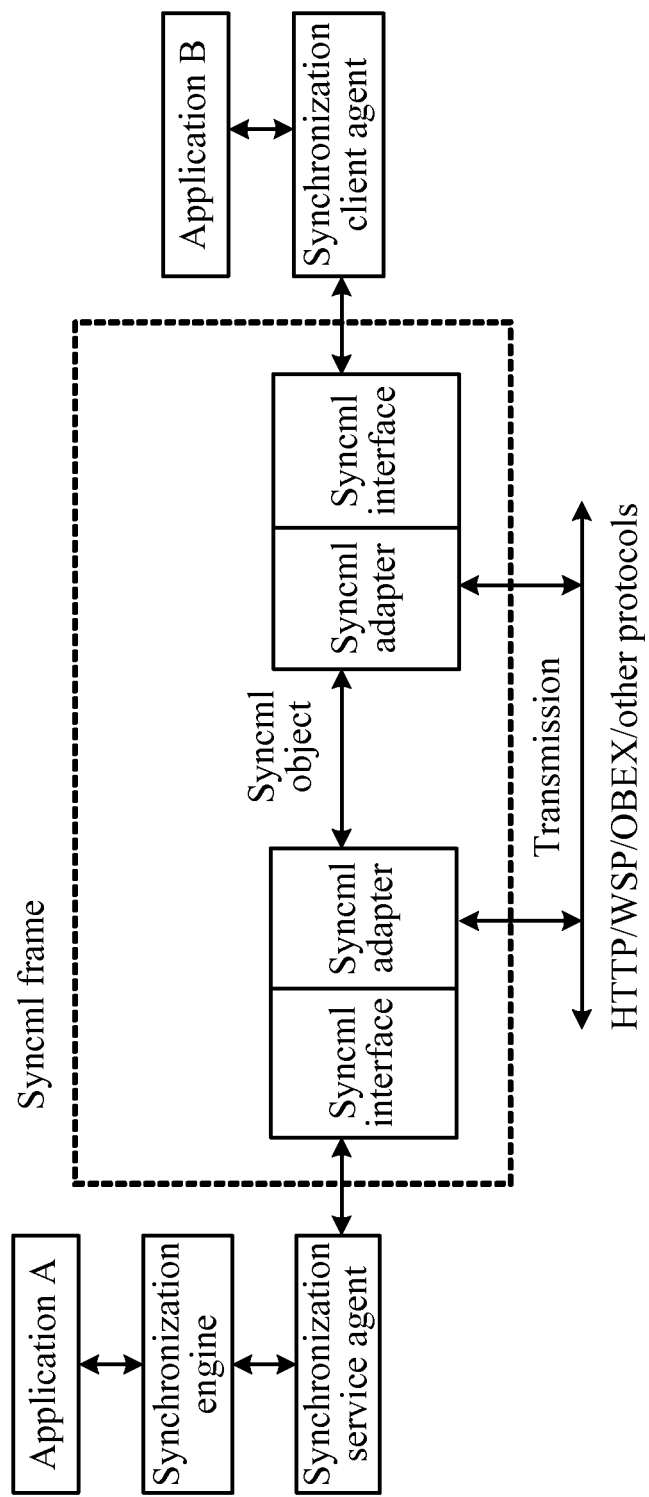
FIG. 1 is a structural view of a frame of a SyncML DS protocol in the conventional art.
Figure 2:
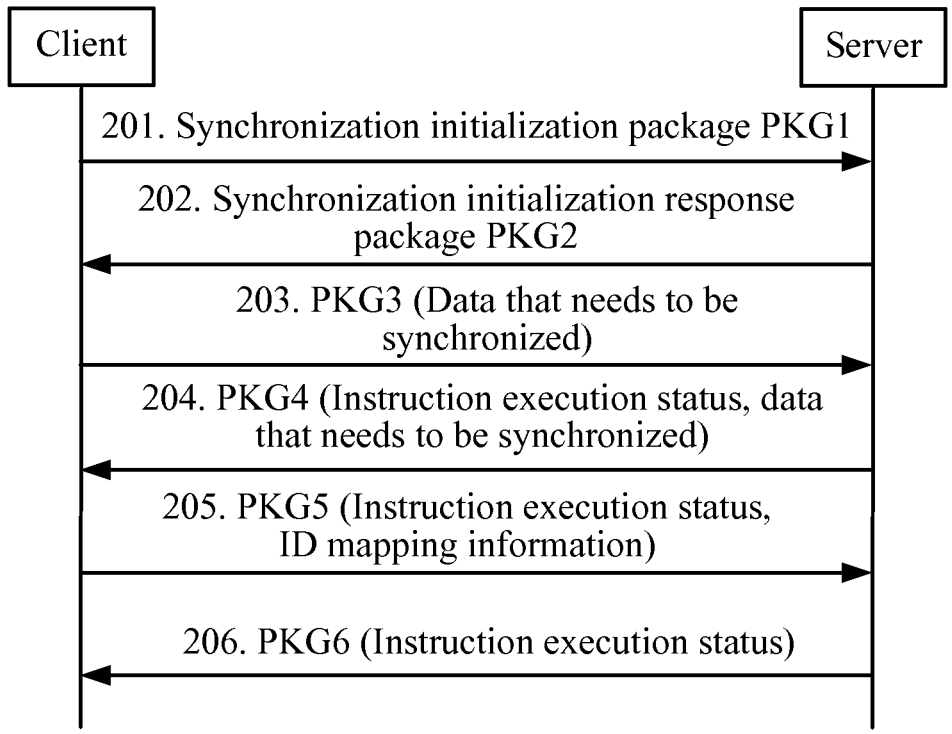
FIG. 2 is a flow chart of DS of a server and a client in the SyncML synchronization protocol in the conventional art.
Figure 3:
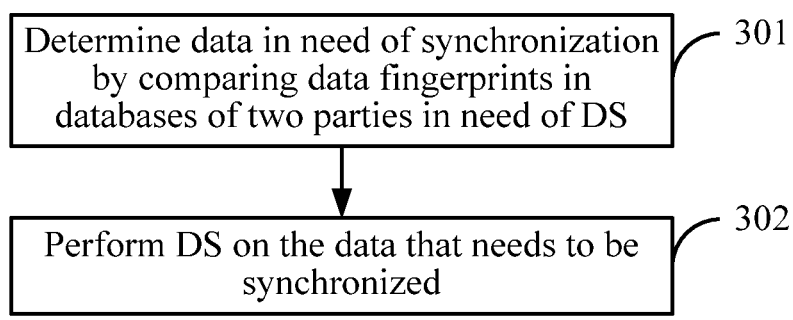
FIG. 3 is a flow chart of a method for implementing DS according to an embodiment of the present invention.

FIG. 3 is a flow chart of a method for implementing data synchronization (DS) according to an embodiment of the present invention. As shown in FIG. 3, the method includes the following steps.

In step 301, data fingerprints in databases of two parties in need of DS are compared, and data that needs to be synchronized is determined.

In step 302, the DS is performed on the data that needs to be synchronized.

To make the objectives, technical solutions, and advantages of the present invention more comprehensible, the present invention is further illustrated in detail in the following with reference to the accompanying drawings and preferred embodiments.

As different fingerprint algorithms calculate different fingerprints for the same data, in the embodiment shown in FIG. 3, the data fingerprints in the databases of the two parties in need of DS (for example, a server and a client) have to be calculated through the same fingerprint algorithm. If the server and the client use a unidirectional fingerprint generation mode, that is, the client calculates the data fingerprint and the server only saves the fingerprint calculated by the client, such that the fingerprints of the same data saved by the two parties are the same. If the server and the client use a bidirectional fingerprint generation mode, that is, the server and the client calculate fingerprints separately and save separately calculated fingerprints, the two parties need to use the same fingerprint algorithm, so as to ensure that the two parties save the same fingerprint for the same data.

Therefore, before performing the DS process as shown in FIG. 3, the server and the client need to negotiate a fingerprint generation mode and an algorithm for calculating fingerprints. In the conventional art, the two parties in need of DS select the unidirectional or bidirectional fingerprint generation mode through default agreement, that is, it is agreed to select the unidirectional or bidirectional mode. This agreement mode confines flexibility of fingerprint use. More important, in the conventional art, no solution is provided as for which fingerprint generation mode is used in which situation to implement DS accurately and effectively.

Next, several fingerprint generation modes through negotiation by the server and client are provided in the embodiments of the present invention.

In a first mode, a Boolean unidirectional identifier (ID) variable FPMethod is saved on the server. If a value of the FPMethod is true, it indicates that a unidirectional fingerprint generation mode is to be used. That is to say, the client calculates the fingerprints, the server saves the fingerprints provided by the client, and for the data without saved fingerprints in the server, and null fingerprints are used to represent the fingerprints of the data. If the value of the FPMethod is false, it indicates that a bidirectional fingerprint generation mode is to be used. That is to say, the client and server calculate fingerprints separately and save their own calculated fingerprints. A default value of the FPMethod may be false. When a fingerprint algorithm negotiated by the server and terminal is not in a fingerprint algorithm set of the server, the FPMethod is set as true.

In a second mode, one of the server and client receives synchronization data and a fingerprint of the synchronization data sent by the other one, saves the received synchronization data, and calculates the fingerprint of the saved data. If the calculated fingerprint is different from the received fingerprint, the server is required to set the FPMethod as true. The verification work may be preferably accomplished at a server side. That is, the server receives the synchronization data and fingerprint sent by the client, saves the received data, calculates the fingerprint, and compares the calculated fingerprint with the received fingerprint.

In a third mode, a fingerprint generation mode is determined according to the specific used fingerprint algorithm type. For example, if changes occur in contents of a change log algorithm after synchronization, the fingerprint is set as 1, and is then set as 0 after next synchronization. Therefore, the fingerprints calculated for the same data by the server and client with the algorithm stay consistent. In the situation that the change log algorithm is used to calculate fingerprints, the bidirectional fingerprint generation mode is able to be used. The fingerprints calculated with the Hash algorithm may be different when saving formats of the same data are different. As the modes for saving data of the client and server may be inconsistent, the unidirectional fingerprint generation mode is used in the situation of using the Hash algorithm to calculate the fingerprints.

In a fourth mode, the unidirectional generation mode is used for fingerprints of all leaf nodes in a database that needs to be synchronized, that is, fingerprints of the data. The unidirectional or bidirectional calculation mode may be used for intermediate nodes, that is, directories and folders. Which one of the unidirectional and the bidirectional modes is to be used may be determined according to the method in the foregoing modes. At this time, the meaning of the FPMethod is whether to use the unidirectional fingerprint generation mode for the directories and the folders.

Among the four fingerprint generation modes through negotiation of the server and client, the server and client need to communicate to learn information such as whether the other one supports fingerprint characteristics and which fingerprint algorithms the other one supports. For example, the server needs to notify the terminal of an ID of the negotiated unidirectional or bidirectional fingerprint generation mode or notify the terminal of a fingerprint algorithm set that the server supports. In the embodiments of the present invention, three communication modes for negotiation between the server and client are provided, namely, a Notification mode, a DS management object (MO) setting mode, and a Device Info indication mode, which are illustrated in the following separately.

The first mode is the message notification mode.

Figure 4:
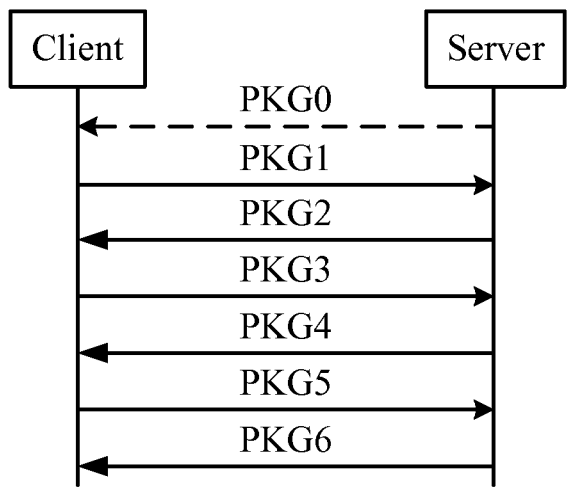
FIG. 4 is a flow chart of DS between a client and a server according to an embodiment of the present invention.
Figure 5:
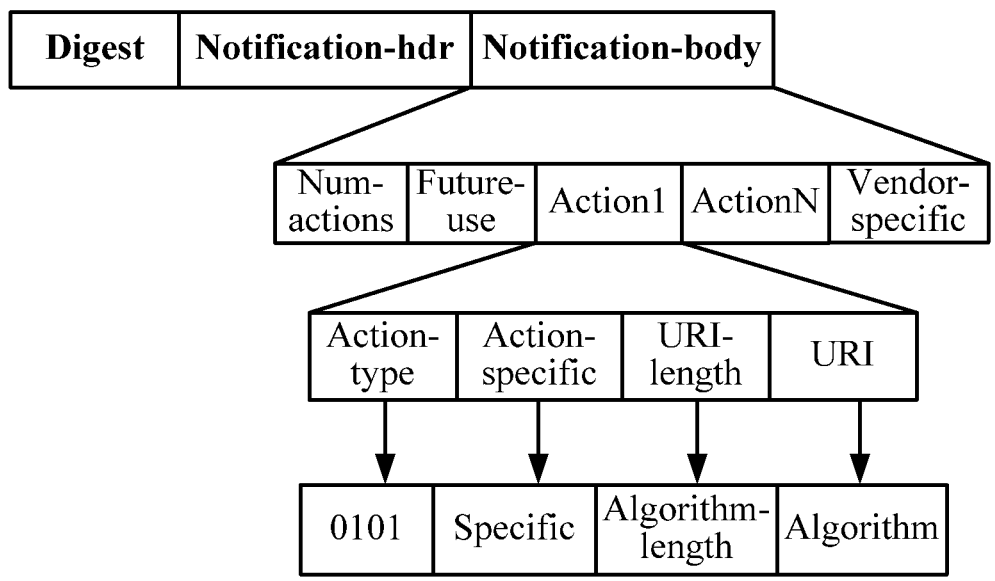
FIG. 5 is a schematic diagram of a format of a notification message according to an embodiment of the present invention.

FIG. 4 is a flow chart of DS between a client and a server according to an embodiment of the present invention. As shown in FIG. 4, before a PKG1 is sent, the server delivers a PKG0 to indicate whether the server supports fingerprint characteristics and a fingerprint algorithm set that the server supports. The client saves the two parameters in an item related to the server ID. The PKG0 is a notification message. The server only notifies the client again through a notification message when changes occur in parameters such as the fingerprint characteristics and the fingerprint algorithm set. FIG. 5 is a schematic diagram of a format of a notification message according to an embodiment of the present invention. As shown in FIG. 5, an "Action 1" field in the notification message body (notification-body) further includes four fields, namely, an "Action-type" field, an "Action-specific" field, a "URI-length" field, and a "URI" field. In the embodiments of the present invention, the four fields are defined as "0101", "Specific", "Algorithm-length", and "Algorithm", respectively. <0101>; 'adapted to identify that the Action1 field indicates fingerprint characteristics'
<Specific>::=<noFPsupport>/<FPClient>/<FPMutually>;
'adapted to identify fingerprint support information of the server'
For example, <noFPsupport>::='00'; 'it represents that the server does not support fingerprint'
<FPClient>::='10'; 'it represents that the client generates a fingerprint unidirectionally'
<FPMutually>::='11'; 'it represents that both the client and server generate fingerprints'
<Algorithm-length>::=1*CHAR; 'adapted to identify a length of fingerprint algorithm information of the server'
<Algorithm>::=<Algorithm-length>*4*BIT; 'adapted to identify the fingerprint algorithm information of the server'

In the foregoing parameters, each fingerprint algorithm in the Algorithm is represented by 4 bits, and each value represents an algorithm type. The value in the Algorithm formed by concatenating 4 bits corresponding to each algorithm that the server supports. A length of the concatenated string is set through the Algorithm-length.

The second mode is the DS MO setting mode.

The server delivers its own information related to fingerprints to the client through the DS MO. The DS MO of the client is subsequently read, written, and modified through a device management (DM) mode. The client may also save its own information related to fingerprints in the DS MO.

Figure 6:
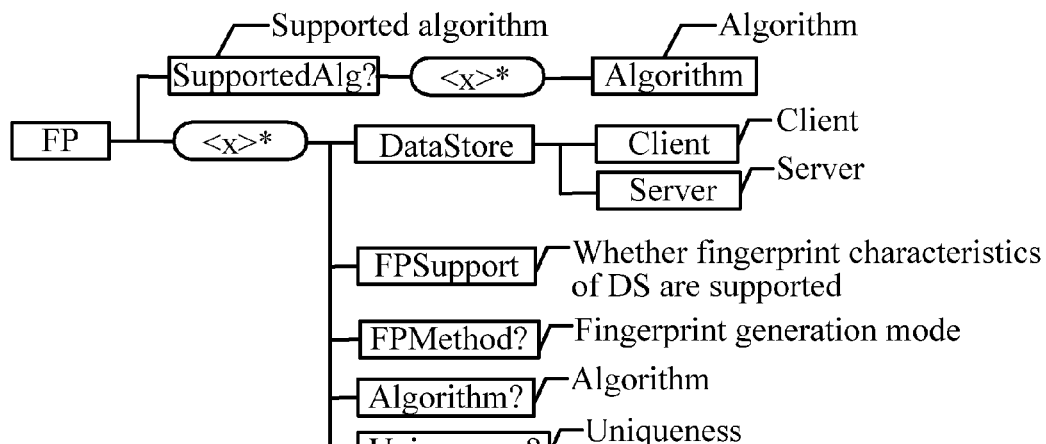
FIG. 6 is a schematic diagram of a tree structure added in a DS MO of a client according to an embodiment of the present invention.

FIG. 6 is a schematic diagram of a tree structure added in a DS MO of a client according to an embodiment of the present invention. As shown in FIG. 6, whether fingerprint characteristics of the DS are supported is recorded in the FPSupport. The used fingerprint algorithm is recorded in the Algorithm. The description of the MO node as shown in FIG. 6 is provided in the following.

| <FP> | | | |
|---|---|---|---|
| Status | Occurrence | Format | Access |
| REQUIRED | One | Node | Get |

This is an internal node, recording information related to fingerprints of the DS client or server. In the table, information of the <FP> node is described. A status of the node is "REQUIRED", representing that the node is essential. An occurrence of the node is "One", representing that the node only occurs once in the tree structure as shown in FIG. 6. A format of the node is "Node", representing that the node is an intermediate node. An access mode of contents of the node is "Get", representing that the contents of the node is obtainable, that is, readable.

| <FP>/<SupportedAlg> | | | |
|---|---|---|---|
| Status | Occurrence | Format | Access |
| REQUIRED | ZeroOrOne | Node | Get |

This is an internal node, recording fingerprint algorithms supported by the DS client. If the node does not exist, it indicates that the DS client does not support the fingerprints. An occurrence of the node in a table corresponding to the node is "ZeroOrOne", representing that the node does not occur or occurs once in the tree structure shown in FIG. 6.

| <FP>/<SupportedAlg>/<X> | | | |
|---|---|---|---|
| Status | Occurrence | Format | Access |
| REQUIRED | ZeroOrMore | Node | Get |

This is a placeholder node, adapted to contain one or more leaf nodes and record fingerprint algorithms that the DS client supports. If the node does not exist, it indicates that the DS client does not support the fingerprints. An occurrence of the node in a table corresponding to the node is "ZeroOrMore", representing that the node does not occur or occurs once in the tree structure as shown in FIG. 6.

| <FP>/<SupportedAlg>/<X>/<Algorithm> | | | |
|---|---|---|---|
| Status | Occurrence | Format | Access |
| REQUIRED | One | Chr | Get |

This is a leaf node, recording fingerprint algorithms supported by the DS client. If the node does not exist, it indicates that the DS client does not support fingerprints. A format of the node in a table corresponding to the node is "Chr", representing that the node is a leaf node and is a string type.

A possible value and explanation of the node are as shown in Table 3.

TABLE 3

| Value | Explanation |
|---|---|
| Changed Flag | A flag algorithm for a data item: Whether its value is changed serves as its fingerprint. 0 represents not changed and 1 represents changed. |
| Changed Count | A count algorithm for a data item: The number of changes serves as its fingerprint. |
| Hash | A Hash algorithm for hashing a data item: A Hash value serves as its fingerprint. |
| Sub-Item specific | A field-specific algorithm for a data item: The fingerprint information is able to indicate which fields are modified. |
| MD5 | A digest algorithm for performing MD5 digest on a data item: A digest value serves as its fingerprint. |
| CRC | A cyclic redundancy check algorithm for performing CRC on a data item: A CRC value serves as its fingerprint. |
| Timestamp | A timestamp algorithm: a timestamp that a data item is changed for the last time serves as its fingerprint. |
| Reserved | Reserved for further use. |

| <FP>/<x> | | | |
|---|---|---|---|
| Status | Occurrence | Format | Access |
| REQUIRED | ZeroOrMore | Chr | Get |

The node is a placeholder node, and is adapted to indicate fingerprint characteristics of databases different for a client or server.

| <FP>/<x>/<DataStore> | | | |
|---|---|---|---|
| Status | Occurrence | Format | Access |
| REQUIRED | One | Node | Get |

The node is adapted to indicate to which database the fingerprint characteristics are related. The node stores ID information of databases corresponding to the client and the server.

| <FP>/<x>/<DataStore>/<Client> | | | |
|---|---|---|---|
| Status | Occurrence | Format | Access |
| REQUIRED | One | Chr | Get |

The node is adapted to indicate an ID of the client database.

| <FP>/<x>/<DataStore>/<Server> | | | |
|---|---|---|---|
| Status | Occurrence | Format | Access |
| REQUIRED | One | Chr | Get |

The node is adapted to indicate an ID of the server database. The client database and the server database have to be in pair and correspond to each other.

| <FP>/<x>/<FPSupport> | | | |
|---|---|---|---|
| Status | Occurrence | Format | Access |
| REQUIRED | One | Bool | Get |

The node is adapted to indicate whether some database of the DS client or server supports fingerprint characteristics. A format of the node in a table corresponding to the node is "Bool", representing that the node is a leaf node and a Boolean type.

Meanings of values of the node are as shown in Table 4.

TABLE 4

| Value | Description |
|---|---|
| True | Fingerprint characteristics are supported. |
| False | Fingerprint characteristics are not supported. |

| <FP>/<x>/<FPMethod> | | | |
|---|---|---|---|
| Status | Occurrence | Format | Access |
| REQUIRED | ZeroOrOne | Bool | Get |

A fingerprint generation mode for some database of the DS client or server is defined. Meanings of values of the node are as shown in Table 5.

TABLE 5

| Value | Description |
|---|---|
| True | The client generates a fingerprint unidirectionally. |
| False | The client and the server generate fingerprints bidirectionally. |

| <FP>/<x>/<Algorithm> | | | |
|---|---|---|---|
| Status | Occurrence | Format | Access |
| REQUIRED | ZeroOrOne | Chr | Get |

This is a leaf node, recording a fingerprint algorithm used for some database of the DS client or server. A value of the node is one of the algorithms that the client supports.

| <FP>/<x>/<Uniqueness> | | | |
|---|---|---|---|
| Status | Occurrence | Format | Access |
| REQUIRED | ZeroOrOne | Bool | Get |

This is a leaf node, indicating whether a fingerprint calculated with a fingerprint algorithm is unique for some database. Meanings of values of the node are as shown in Table 6.

TABLE 6

| Value | Description |
|---|---|
| True | Unique |
| False | Not unique |

If fingerprints of all data items in the database are different, the fingerprint algorithm is unique (that is, fingerprints obtained with the fingerprint algorithm are unique). If two or more different data items corresponding to the same fingerprint, the fingerprint algorithm is not unique (that is, the fingerprints obtained with the fingerprint algorithm are not unique).

As can be seen from FIG. 6, an <FP>/<SupportedAlg> branch is information about fingerprint characteristics of the client. The server reads information about the fingerprint characteristics of the client in the tree data structure as shown in FIG. 6 from the MO of the client, that is, the server reads information saved in the <FP>/<SupportedAlg> branch. According to the read information, information of the fingerprint characteristics of the databases of the server and client that needs to be synchronized is determined, such as whether the unidirectional fingerprint generation mode or the bidirectional fingerprint generation mode is to be used, which fingerprint algorithm to be used, uniqueness information of the fingerprint algorithm. The determined information is saved in a corresponding position of a <FP>/<x>xbranch in the tree structure as shown in FIG. 6 in the MO of the client, so as to achieve the objectives of negotiating the fingerprint generation mode and the fingerprint algorithm, as well as the objective that the server notifies the client of a negotiate result.

The third mode is the Device Info indication mode.

The client and server may also save fingerprint information of databases that needs to be synchronized in the Device Info, and accomplish the negotiation process by reading the information in the Device Info. A data schema of elements in the Device Info is as follows. <xs:element name="FPSupport"type="xs:boolean"/>

This element is adapted to represent whether the fingerprint is supported. A value of the element may be True or False. The True represents that the fingerprint is supported and the False represents that the fingerprint is not supported.

Both the server and terminal save a Boolean variable FPMethod identifying a unidirectional fingerprint generation mode. If a value of the variable is true, it indicates that the fingerprint is calculated by the client and the server saves the fingerprint provided by the client. The data without saved fingerprints in the server uses null fingerprints to represent the fingerprints of the data. If the value of the variable is false, it indicates that the fingerprints are calculated by the client and server at the same time and the calculated fingerprints are saved separately. A default value of the FPMethod may be false. The FPMethod value is saved in the Device Info related to the device. The Schema may be similar to the following. <xs:element name="FPMethod"type="xs:boolean"default="false"/>

Its value may be True or False. The True represents the unidirectional fingerprint generation mode and the False represents the bidirectional fingerprint generation mode.

The Schema of the fingerprint generation algorithm may be as follows.
<xs:element name="FPAlgorithm"type="xs:char"/>

The element is adapted to indicate the fingerprint algorithm. The meanings of values of the element may be the same as described in Table 3.

<xs:element name="Uniqueness"type="xs:Boolean"/>

The element is adapted to indicate whether the fingerprint algorithm is unique.

The negotiation of the fingerprint generation mode and the fingerprint algorithm by the server and the client through the Device Info includes the following steps. First, the client saves its fingerprint characteristics information in its Device Info, such as information of whether the fingerprint is supported and the supported fingerprint algorithm set. The server delivers a notification message to the client, so as to instruct the client to report information about fingerprint characteristics in the Device Info. The client receives the notification message and reports information of fingerprint characteristics in its Device Info to the server. The server determines the fingerprint generation mode and fingerprint algorithm according to the information reported by the client and information of its own fingerprint characteristics. For example, the server examines from the reported information whether the server supports one fingerprint algorithm in the fingerprint algorithm set that the client supports. If the server supports one fingerprint algorithm in the fingerprint algorithm set that the client supports, the server selects a fingerprint algorithm that both the server and client support and determines whether the fingerprint generation mode is unidirectional or bi-directional. If the server does not support one fingerprint algorithm in the fingerprint algorithm set that the client supports, the server determines that the fingerprint generation mode is unidirectional. The server sends a determination result to the client through the notification message. The client learns the negotiation result through the notification message. If the notification message indicates unidirectional fingerprint generation, the client selects a fingerprint algorithm in the fingerprint algorithm set that the client supports.

Optionally, when the server determines that it does not support any fingerprint algorithm in the fingerprint algorithm set that the client supports and further determines that the fingerprint generation mode is unidirectional, the server specifies an algorithm in the fingerprint algorithm set that the client supports and notifies the client of the specified algorithm through the notification message.

In the embodiment, three communication modes for the negotiation by the server and the client are provided, including a notification mode, a DS MO setting mode and a Device Info indication mode. Through any one of the foregoing three modes, the server and the client may negotiate the fingerprint generation mode and fingerprint algorithm related in the DS process. Next, a specific embodiment of implementing the DS of the present invention is illustrated.

Figure 7:
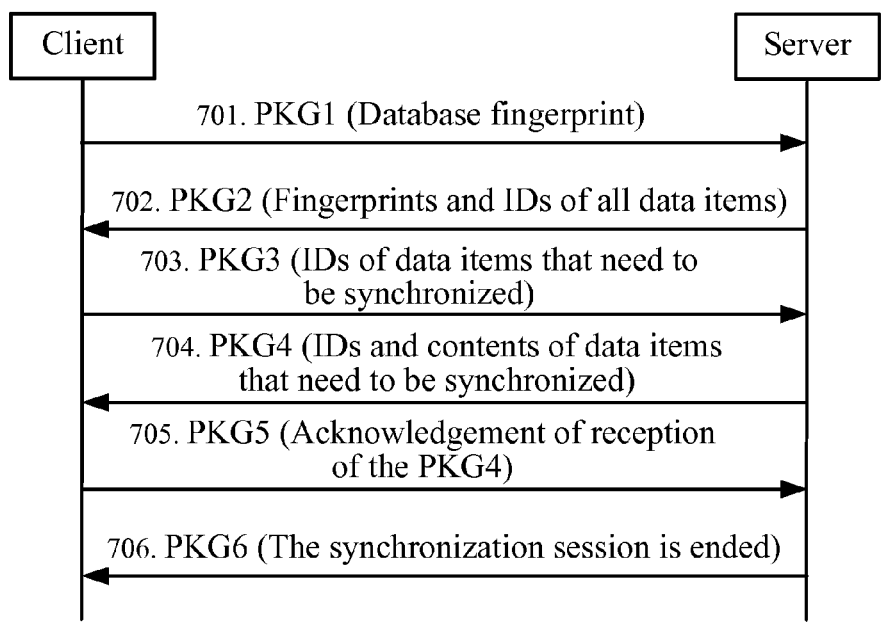
FIG. 7 is a flow chart of a method for implementing DS according to a first preferred embodiment of the present invention.

FIG. 7 is a flow chart of a method for implementing DS according to a first preferred embodiment of the present invention. As shown in FIG. 7, the method includes the following steps.

In step 701, a client sends a PKG1 to a server. The PKG1 further includes database fingerprint Container of the client.

If the server and the client do not negotiate the fingerprint generation method in advance, in this step, the PKG1 may further contain a fingerprint algorithm used by the client. If the server does not record whether a terminal supports the fingerprint characteristics, the PKG1 may further contain a Boolean parameter FPSupport, indicating whether the client supports the fingerprint characteristics.

A message example of the PKG1 is as follows.

```
<Alert>
... ...
<FPSupport>true</FPSupport>      <!-the client supports fingerprints-->
<Container>142a7ed3</Container>  <!-a fingerprint of a client database-->
<Algorithm>MD5</Algorithm>       <!-a fingerprint algorithm used by the client is
MD5-->
</Alert>
```

In step 702, after the server receives the PKG1, it is checked whether the received Container is consistent with a saved fingerprint Container of its own database. If the received Container is consistent with a saved fingerprint Container of its own database, it indicates that no change occurs in the data and synchronization is not necessary, and the process is ended. If the received Container is not consistent with a saved fingerprint Container of its own database, the server delivers a PKG2 to the client. The PKG2 contains fingerprints and IDs of all data items in the server database.

If the server and the client do not negotiate the fingerprint generation method in advance and the PKG1 in step 701 contains the fingerprint algorithm used by the client, in this step, the server verifies whether the server itself supports the fingerprint algorithm provided in the PKG1. If not, a value of the Boolean parameter FPMethod is set as true, representing that the fingerprint generation mode is unidirectional, and the FPMethod is delivered to the client through the PKG2.

A message example of the PKG2 is as follows.

```
<FPMethod>true</FPMethod>   <!-The server does not support
fingerprints  and unidirectional fingerprint of the client is used.-->
<Status>
   ... ...
   <Data>400</Data>         <!-Database fingerprints Container
of the two parties are inconsistent.-->
</status>
<Put>
<Item>
<GUID>1</GUID> <FingerPrint>12a34dfa</FingerPrint>
</Item>
<Item>
 <GUID>2</GUID> <FingerPrint>35ba147f</FingerPrint>
 </Item>
            ......
</Put>
```

In step 703, after receiving the PKG2, the client compares fingerprints of delivered data items with fingerprints of corresponding data items in its database according to IDs of the data items one by one, determines data items that need to be synchronized according to differences of the fingerprints, and sends a PKG3 to the server. The PKG3 contains IDs of the data items that need to be synchronized.

If the synchronization with the server is needed, in this step, the PKG3 may further contain contents of data items corresponding to IDs of the data items that need to be synchronized. If the unidirectional fingerprint generation mode is used, the PKG3 further needs to carry fingerprints of the data items that need to be synchronized.

A message example of the PKG3 is as follows.

```
<RequiredID>
    <Item>
        <LUID> LUID004 </LUID>    <!-IDs of data
items that need to be synchronized.-->
        ...
    </Item>
    ... ...
</RequiredID>
```

In step 704, after receiving the PKG3, the server examines a change log in its database, determines which data items that need to be synchronized are due to changes occurred in data in a server database and which data items that need to be synchronized are due to changes occurred in data in the client database, and delivers IDs and corresponding data item contents of data items that need to be synchronized due to changes occurred in data in the server database to the client in the PKG4.

If the synchronization with the server is needed, in step 703, the PKG3 contain data item contents corresponding to IDs of the data items that need to be synchronized. In this step, the server also needs to synchronize the data that needs to be synchronized due to changes occurred in the data in the client database in its database according to data item contents corresponding to data item IDs in the PKG3. If the unidirectional fingerprint generation mode is used, the PKG3 carries fingerprints of data items that need to be synchronized. In this step, the server synchronizes data in its database and at the same time saves fingerprints corresponding to the synchronized data carried in the PKG3.

If the used fingerprint algorithm is able to determine integrity of the data, for example, the Hash algorithm, the PKG4 may further include fingerprints corresponding to the data item contents, such that a receiver can verify the integrity of the received data according to the fingerprints.

A message example of the PKG4 is as follows.

```
<Sync>
        <Replace>
        <Item>
                <LUID>1</LUID>
                <Data><!-- data of the item --></Data>
                <FingerPrint>9d8723e5</FingerPrinter>
        </Item>
        ......
    </Replace>
</Sync>
```

In step 705, after receiving a PKG4, the client synchronizes corresponding data in its database according to contents in the PKG4, calculates and saves fingerprints for the newly synchronized data, and sends an acknowledgement message PKG5 to the server at the same time.

If the unidirectional fingerprint generation mode is used, the PKG5 further needs to include fingerprints and corresponding data item IDs calculated by the client for the newly synchronized data.

If the client does not send contents and fingerprints of synchronized data items to the server in the PKG3, contents and fingerprints of data items that need to be synchronized with the server are sent in the PKG5 in this step.

In step 706, after receiving the PKG5, the server returns a PKG6 to the client, so as to represent that this synchronization session is ended.

If the PKG5 includes contents and fingerprints of replaced data items, the server acknowledges reception of the PKG5 to the client through the PKG6, and returns a synchronization result.

The synchronization process as shown in FIG. 7 is ended here.

In the process as shown in FIG. 7, as the client first sends the fingerprint Container of its databases to the server and the server determines whether synchronization is needed by comparing Container of the two parties. When the synchronization is not needed, the process is ended directly. This solution saves unnecessary data sending processes and improves the efficiency. Also, in the synchronization process as shown in FIG. 7, the server and the client may be exchanged. That is, in step 701, the server may send the PKG1 to the client and then the client sends the PKG2 to the server, and the rest may be deduced through analog.

In step 703 in the process as shown in FIG. 7, the client needs to compare fingerprints of all data items in the server database with fingerprints of corresponding data items in its database according to the IDs of the data items, so as to determine data items that need to be synchronized. The fingerprint of a data item here means a fingerprint of a leaf node in the database. If a large amount of leaf nodes exist in the database, in step 703, the method of comparing fingerprints of the leaf nodes one by one is time-consuming. Therefore, a method of determining synchronization data by comparing fingerprints of nodes in the server database and client database according to an embodiment of the present invention is provided with reference to FIG. 8 and FIG. 9.

Figure 8:
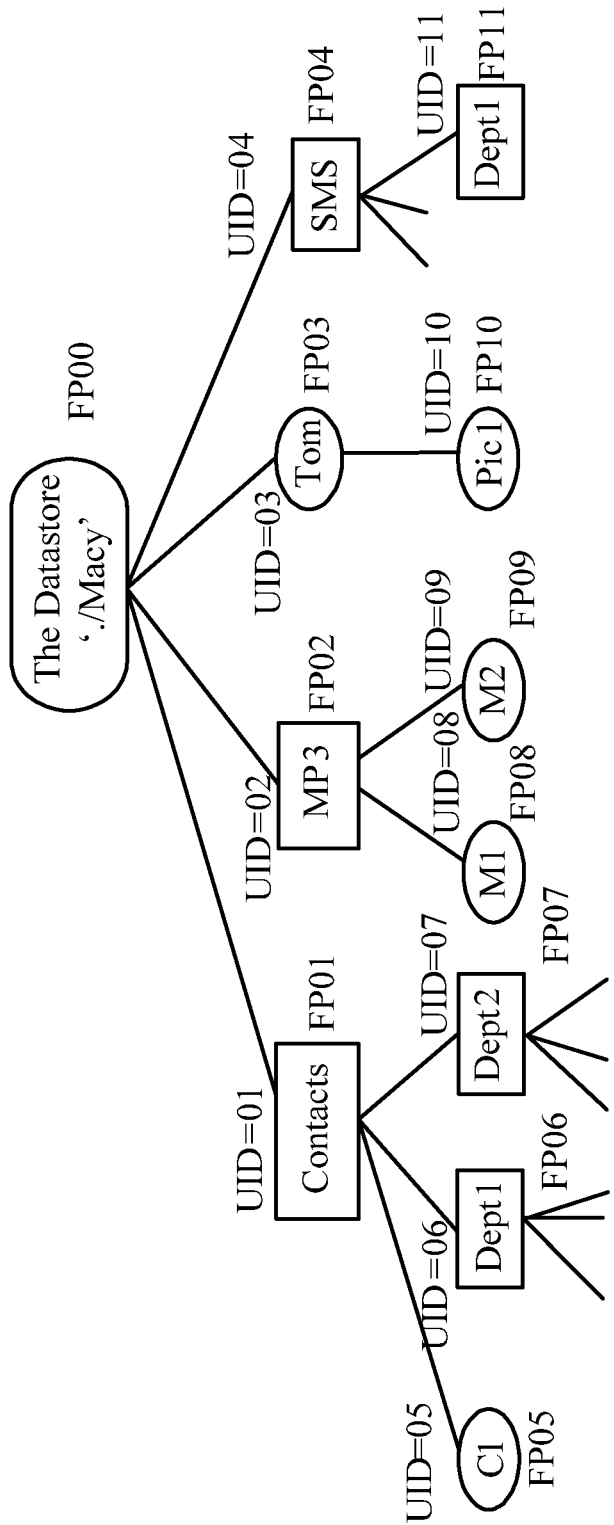
FIG. 8 is a schematic diagram of a database structure according to an embodiment of the present invention.

FIG. 8 is a schematic structural view of a database according to an embodiment of the present invention. As shown in FIG. 8, each node in the database has its own ID (represented by a UID in FIG. 8) and fingerprint. For example, the node MP3 has a UID=02 and a fingerprint FP02, such that a fingerprint FP00 of a root node is a fingerprint Container of the database. A fingerprint of each intermediate node is calculated through fingerprints of its subnodes. For example, a fingerprint FP01 of an intermediate node Contacts is obtained through fingerprint calculation of its subnodes fingerprints FP05, FP06, and FP07. A fingerprint of the leaf node is obtained through calculation of contents of data items in the leaf node.

Figure 9A:
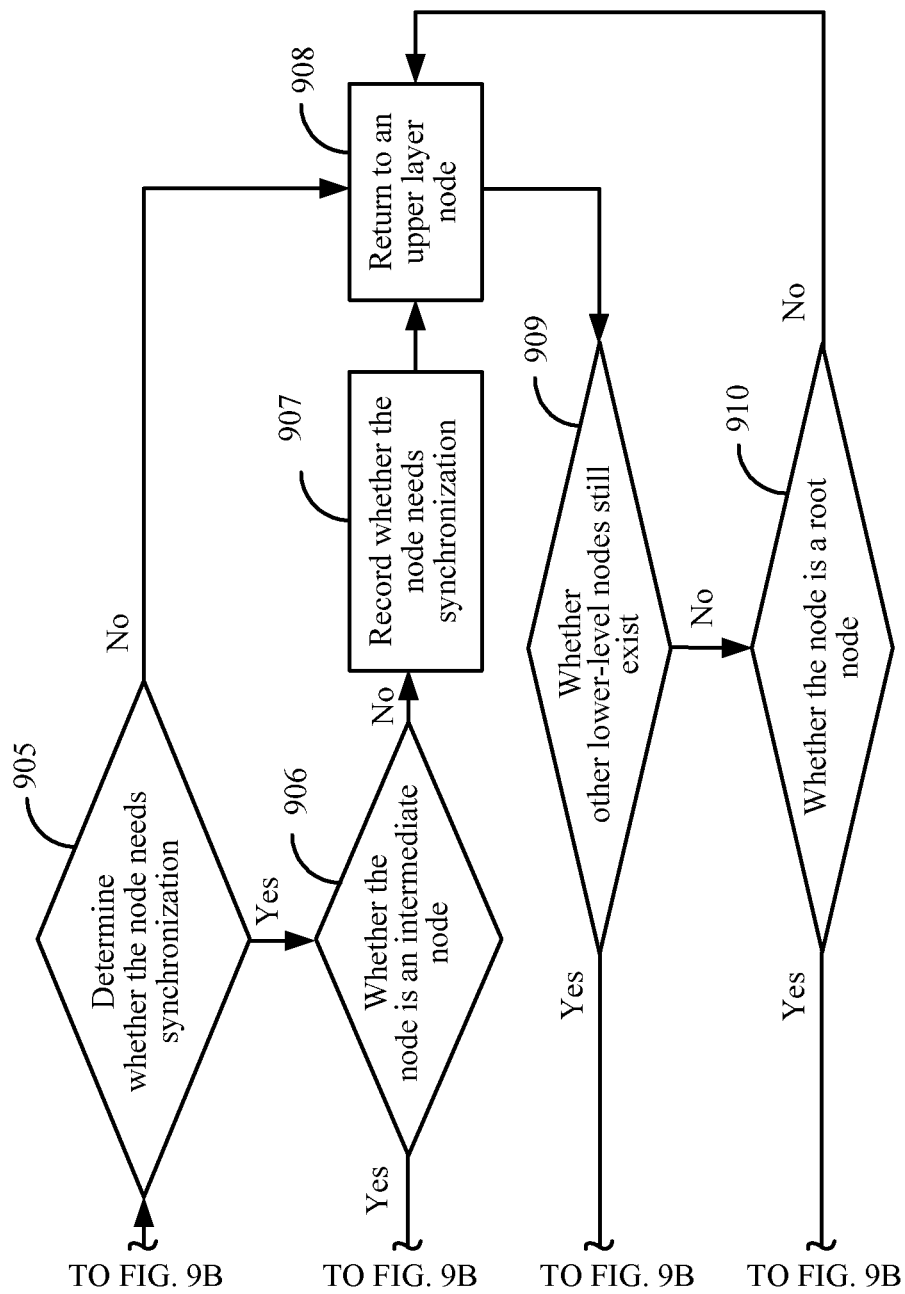
FIG. 9 is a flow chart of a first method for determining data that needs to be synchronized according to an embodiment of the present invention.
Figure 9B:
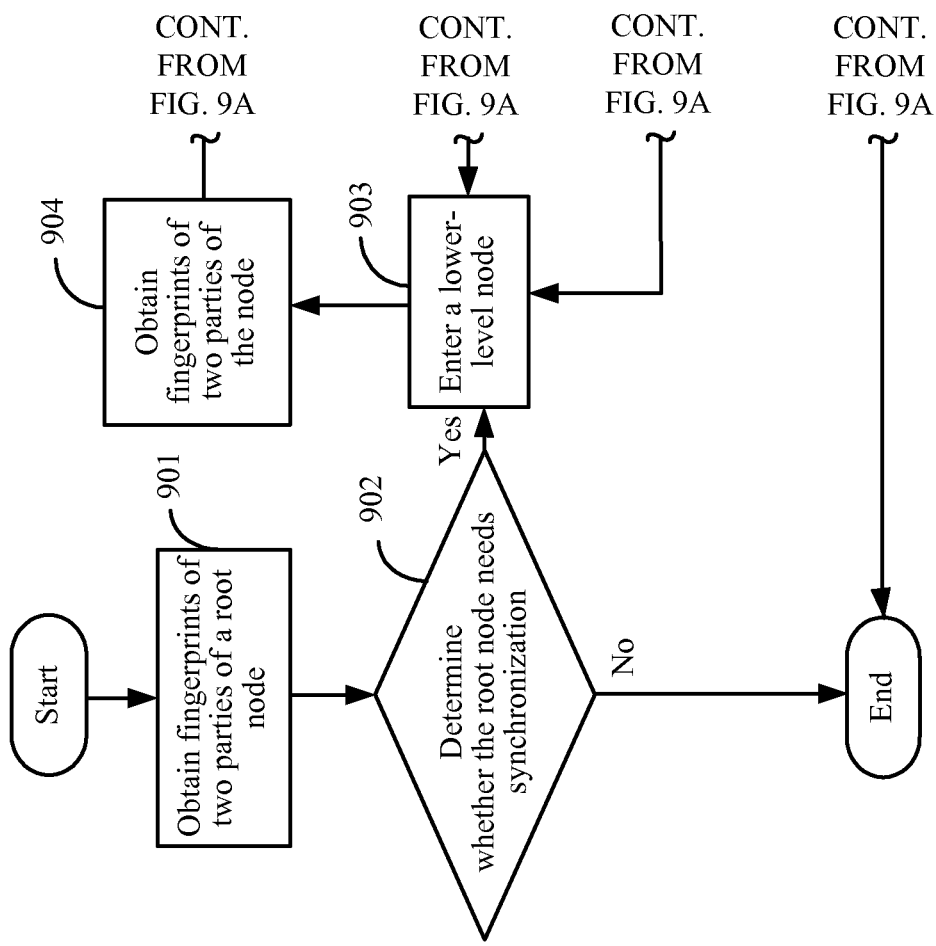

FIG. 9 is a flow chart of a first method for determining data that needs to be synchronized according to an embodiment of the present invention. As shown in FIG. 9, the method includes the following steps.

In step 901, database fingerprints of the server and the client are obtained, that is, fingerprints of root nodes of databases of the two parties are obtained.

In step 902, it is determined whether to perform DS according to database fingerprints of the two parties. If to perform DS, step 903 is performed; if not to perform DS, the process is ended.

In this step, if the database fingerprints of the server and the client are consistent, the DS is not needed. If the database fingerprints of the server and the client are not consistent, the DS is needed.

In step 903, any lower-level node without fingerprint comparison is entered.

In step 904, fingerprints of two parties of the node are obtained.

In step 905, it is determined whether the node needs synchronization according to the obtained fingerprints. If the node needs synchronization, step 906 is performed. If the node does not need synchronization, step 908 is performed.

In this step, if the fingerprints of the server and the client of the node are consistent, the node does not need DS. If the fingerprints of the server and the client of the node are not consistent, the DS is needed.

In step 906, it is determined whether the node is an intermediate node. If the node is an intermediate node, step 903 is performed. If the node is not an intermediate node, step 907 is performed.

In step 907, it is recorded that the node needs synchronization.

In step 908, return to an upper-level node.

In step 909, it is determined whether the returned upper-level node still has other lower-level nodes without fingerprint comparison. If the returned upper-level node still has other lower-level nodes without fingerprint comparison, step 903 is performed. If the returned upper-level node does not have other lower-level nodes without fingerprint comparison, step 910 is performed.

In step 910, it is determined whether the returned, upper-level node is a root node. If the returned upper-level node is a root node, the process is ended. If the returned upper-level node is not a root node, step 908 is performed.

In the process of FIG. 9, fingerprints of root nodes are first determined. That is, it is determined whether the database fingerprints of the server and the client are consistent. If the fingerprints of the root nodes are consistent, the synchronization is not needed. If the fingerprints are inconsistent, a lower-level node is entered and a fingerprint of the lower-level node is obtained. Fingerprints corresponding to the node in the client and server databases are compared to determine whether the node needs synchronization. If the synchronization is needed, the UID of the node is recorded and it is then determined whether the node is an intermediate node, that is, whether the node is a directory or folder. If yes, the intermediate node is entered and the foregoing actions are repeated. After the determination of the node is finished, it is then examined whether an upper-level node of the node still has other lower-level nodes. The same actions are performed until the entire database is determined. A UID record table eventually obtained shows nodes that need to be synchronized in this database. Corresponding to the synchronization process in FIG. 7, after receiving the PKG1, the server performs processes in steps 901 and 902. After receiving the PKG2, the client performs processes in steps 903 to 910, and sends IDs of data items that need to be synchronized recorded in the PKG3, that is, IDs of leaf nodes that need to be synchronized to the server.

Compared with the mode of comparing fingerprints of all data items in the server database with fingerprints of corresponding data items in the client database one by one to determine data items that need to be synchronized, the method shown in FIG. 9 is able to reduce comparison times. For example, when an intermediate node has no changed nodes, after it is examined the fingerprints of the intermediate node are consistent, the examination of all its lower-level nodes may be omitted. That is, various leaf nodes of the intermediate node do not need to be compared.

Next, a data fingerprint comparison mode according to an embodiment of the present invention is further provided. In the mode, fingerprints of nodes in the database are compared layer by layer and data that needs to be synchronized is determined. Here, a layer and a level are two different definitions. A node is a lower-level node of its parent node and an upper-level node of its subnode, such that the relationship is between two nodes. All the nodes with the root node as a parent node are Layer 1 nodes. All the nodes with any Layer n node as a parent node are Layer n+1 nodes, such that the relationship is within the database.

Figure 10:
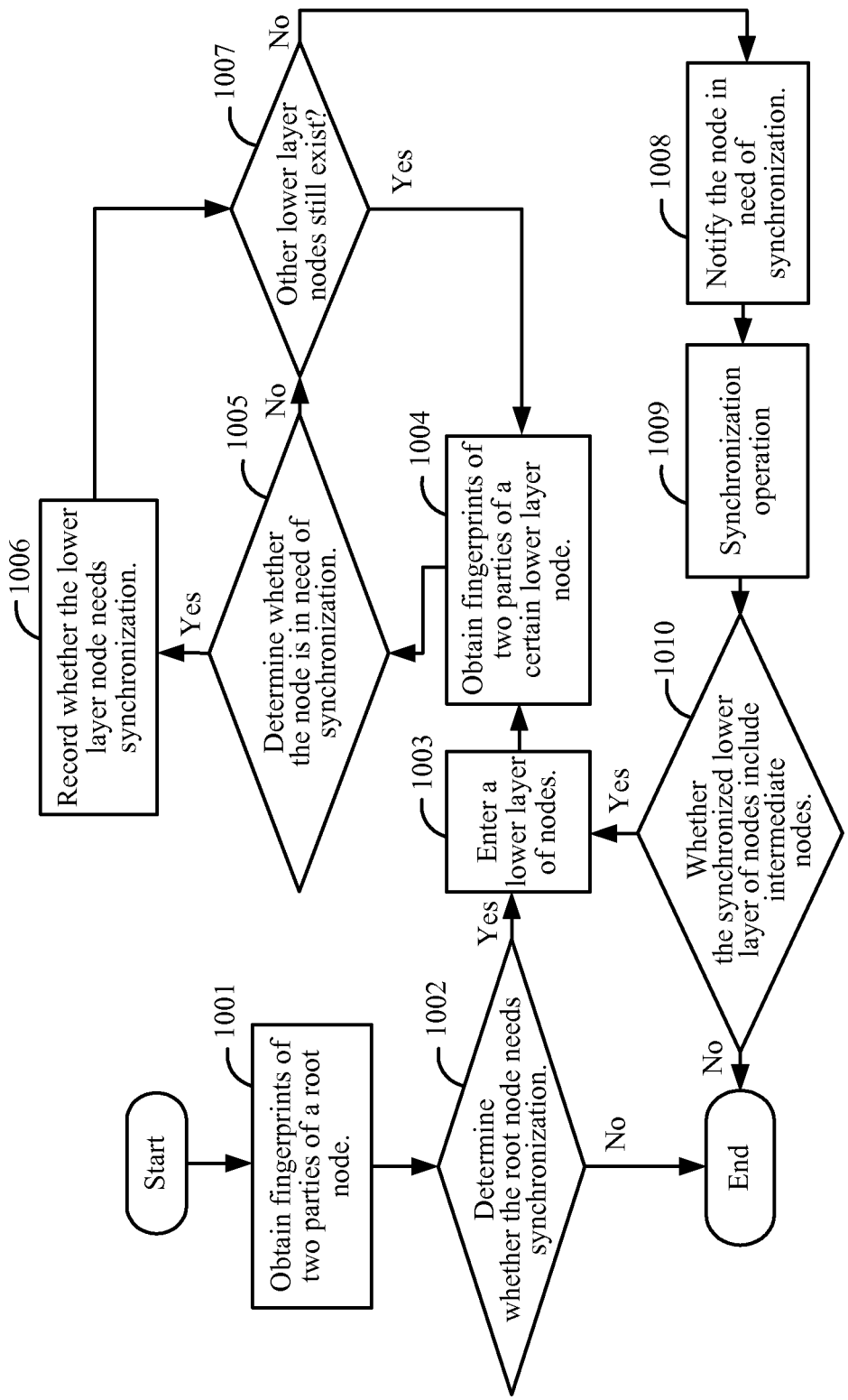
FIG. 10 is a flow chart of a second method for determining data that needs to be synchronized according to an embodiment of the present invention.

FIG. 10 is a flow chart of a second method for determining data that needs to be synchronized according to an embodiment of the present invention. As shown in FIG. 10, the method includes the following steps.

In step 1001, database fingerprints of the server and the client are obtained, that is, the fingerprints of root nodes of databases of the two parties.

In step 1002, it is determined whether the DS is needed according to the database fingerprints of the two parties. If the DS is needed, step 1003 is performed. If the DS is not needed, the process is ended.

In this step, if the database fingerprints of the server and the client are consistent, the DS is not needed. If the database fingerprints of the server and the client are not consistent, the DS is needed.

In step 1003, a lower layer of nodes is entered.

In step 1004, fingerprints of two parties of any node without fingerprint comparison in this layer of nodes are obtained.

In step 1005, according to the obtained fingerprints of the two parties, it is determined whether this lower layer node needs synchronization. If this lower layer node needs synchronization, step 1006 is performed. If this lower layer node does not need synchronization, step 1007 is performed.

In step 1006, it is recorded that the lower layer node needs synchronization, that is, an ID of the node is recorded and step 1007 is performed.

In step 1007, it is determined whether this layer still has nodes without fingerprint comparison. If this layer still has nodes without fingerprint comparison, step 1004 is performed. If this layer still does not have nodes without fingerprint comparison, step 1008 is performed.

In step 1008, the other party is notified of the node that needs to be synchronized.

In step 1009, a synchronization action is performed on the known nodes that need to be synchronized.

In step 1010, it is determined whether the nodes on which the synchronization action is performed include intermediate nodes. If the nodes include intermediate nodes, the process returns to step 1003 and a lower layer of nodes of the intermediate node is entered. If the nodes do not include intermediate nodes, the process is ended.

If the method as shown in FIG. 10 is applied in the synchronization process as shown in FIG. 7, the data items that the server delivers in the PKG2 are IDs and fingerprints of data items of a node in a first layer of the database. The client compares the first layer of nodes, records IDs of nodes with different fingerprints, and reports IDs of nodes that need to be synchronized in a PKG3. If the nodes include intermediate nodes, IDs and fingerprints of all lower-level nodes (Layer Two nodes) of the intermediate nodes are reported at the same time. The server continues to compare the Layer Two nodes and then delivers IDs of the Layer Two nodes that need to be synchronized to the client in the PKG4. If the Layer Two nodes include intermediate nodes, IDs and fingerprints of all lower-level nodes (Layer Three nodes) of the intermediate nodes are delivered in the PKG4 at the same time. The rest follows the same rule till the fingerprint comparison action is performed on all nodes in the database. The DS action may be performed once for all according to an eventually obtained ID list of data items that need to be synchronized, that is, an ID list of the leaf nodes, after the server and the client finish fingerprint comparison actions for all nodes in the database. Optionally, the DS process may also be performed on the leaf nodes that need to be synchronized for each layer after being determined by the server and the client.

In the embodiments shown in FIG. 9 and FIG. 10, the fingerprint comparison action starts from the root node. When the fingerprint comparison action starts from some intermediate node, the intermediate node is used as the root node to determine nodes that need to be synchronized on the subtree in the process as shown in FIG. 9. In the method of comparing node fingerprints layer by layer as shown in FIG. 10, the intermediate node is used as the root node to perform comparison actions by layers.

In the embodiment as shown in FIG. 7, it is first determined whether to perform DS by comparing database fingerprints Container of the server and the client. In the conventional art, the Container is obtained by performing fingerprint action again on fingerprints of all leaf nodes in the database in an ID arranging sequence. The method in the conventional art is subject to time-consuming and energy-consuming action when the leaf nodes have a large number. Therefore, the method of calculating the database fingerprint Container is provided in an embodiment of the present invention.

In the embodiment of the present invention, fingerprints are set for the intermediate nodes to implement calculation of the Container. Specifically, a fingerprint of each leaf node is a normal fingerprint action result, that is, the fingerprint is obtained through the fingerprint action on the contents in the leaf node. A fingerprint of each intermediate node is obtained by performing fingerprint action again on fingerprints of all of its subnodes in an ID arranging sequence. The Container is equal to a fingerprint value of a root node of the database, that is, the Container is obtained by performing the fingerprint action again on fingerprints of all subnodes of the root node in an ID arranging sequence.

It should be noted that in the four currently representative algorithms, the Changed Flag records whether the node is changed, and the Changed Count records the times that the node is changed. The two algorithms are applied in the calculation of the fingerprints of the intermediate node. The calculation result will not be changed due to the arranging sequence of the subnodes. However, the calculation results of the Hash algorithm and the Sub-Item specific algorithm are related to the arranging sequence of the subnode fingerprints. Therefore, when the two algorithms are used to calculate a fingerprint of a parent node, an arranging sequence of the subnodes has to be agreed in advance. For example, an agreed arranging method is based on an UID sequence. Both the client and the server record UID values of the nodes, and the UID values may be arranged in a value sequence. If one node in the server has no UID value, the node may be placed after or before all the nodes.

Figure 11:
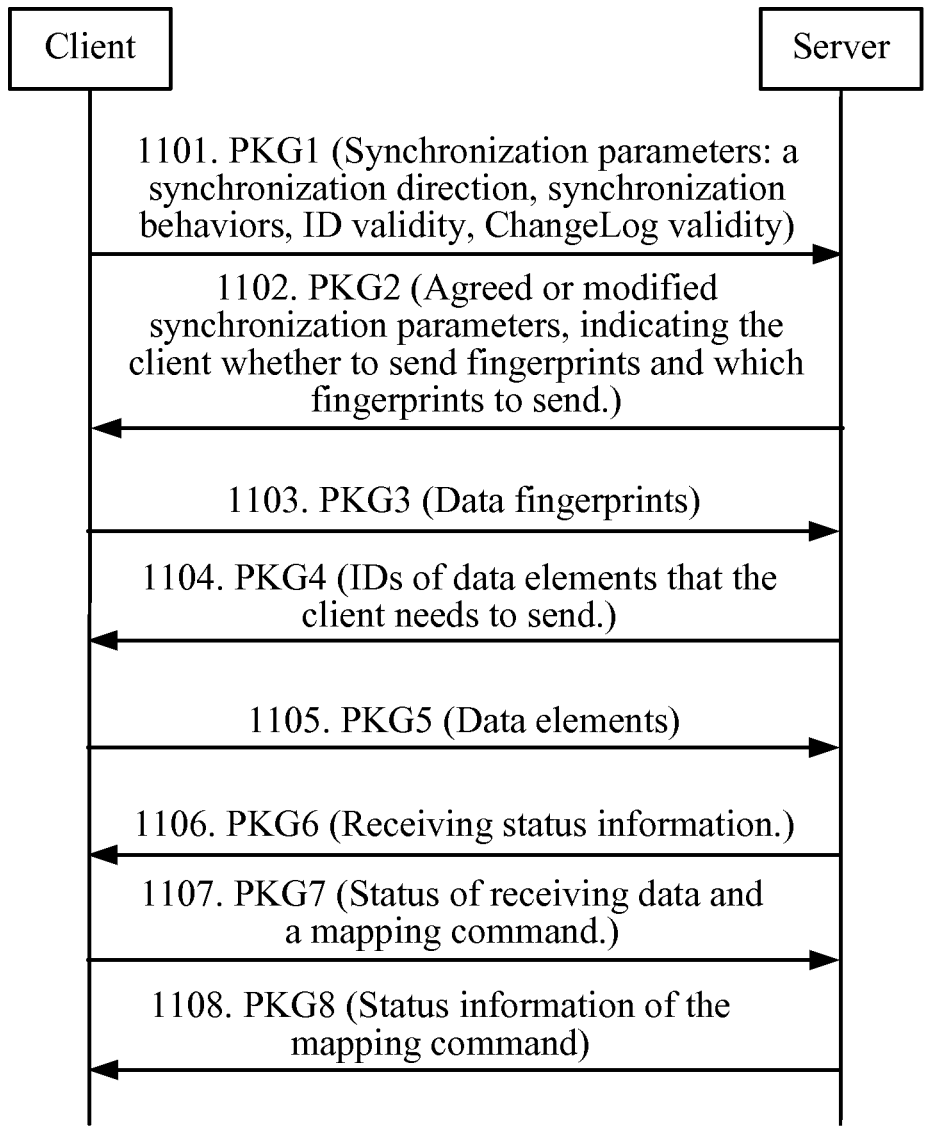
FIG. 11 is a flow chart of a method for implementing DS according to a second preferred embodiment of the present invention.

Next, a method for implementing DS according to another embodiment of the present invention is provided, as shown in FIG. 11. A precondition of the embodiment is that the client and the server have negotiated a fingerprint generation mode and a fingerprint algorithm.

FIG. 11 is a flow chart of a method for implementing DS according to a second preferred embodiment of the present invention. As shown in FIG. 11, the method includes the following steps.

In step 1101, the client sends an initialization packet PKG1 to a server. The PKG1 includes verification information, device capability information of a client, and synchronization negotiation parameters.

Through the report of device capability information by the client, the client informs the server of whether the database of the client supports fingerprints, whether the fingerprint is generated unidirectionally or bidirectionally, and a used fingerprint generation algorithm.

The reporting of the synchronization negotiation parameters aims to facilitate two parties to negotiate a synchronization scheme. The synchronization negotiation parameters include parameters such as a synchronization direction, synchronization behaviors, ID validity, Change Log validity, and whether the fingerprint algorithm is unique.

The synchronization direction includes unidirection from the client, unidirection from the server, bi-direction, and no direction.

The synchronization behaviors include refreshing and saving. Refreshing means that the data of one party is used to overwrite the data of the other party, such that the data of the two parties keeps consistent. The modification in the database of the latter one is not kept. Saving means that one party saves data sent by the other party but the modification of its own data is still kept. For example, before the synchronization, the client adds a data item A and the server adds a data item B. If the client initializes the unidirectional refreshing synchronization, the data item B added on the server is deleted. If the client initializes the unidirectional saving synchronization, the data item B added on the server is not deleted.

The ID validity means whether ID information of data items in a database is valid. Due to software upgrade or misoperation, the ID information of the data items in the database may be lost or disordered.

The Change Log validity means whether the change log in the database is valid. In some situations, the change log is lost or invalid. Therefore, it is unable to learn which data is modified after previous synchronization.

Optionally, the client further sends fingerprint information of internal nodes to be synchronized, for example, fingerprint information of the database or folder. The fingerprint information is adapted for the server to determine whether data of nodes to be synchronized of the client and the node to be synchronized of the server are consistent. If yes, the two parties do not need synchronization and the server may reject the synchronization session. If no, the synchronization session continues for the two parties. If the client clearly knows that the data of the two parties are inconsistent, the fingerprint information does not need to be sent. For example, the Change Log of the client is valid and it is shown that data is modified, so the data of the two parties do not keep consistent. At this time, the client does not need to send the fingerprint information.

A message example is provided.

```
<SyncAlert>
    <SyncType    Direction    ="twoWay"Behaviour
="Preserve"IDValidity
="Valid"ChangeLogValidity ="Valid"/>
    ... ...
</SyncAlert>
```

The message represents that the client indicates that the synchronization direction is bidirectional, the synchronization behavior is saving, the ID is valid, and the Change Log is valid.

In step 1102, the server determines whether the synchronization parameters sent by the client are suitable according to pre-defined rules, and sends an initialization packet PKG2 to the client. In the PKG2, synchronization parameters of agreement or modification are returned, and whether the client sends fingerprints is indicated and fingerprints to be sent are indicated.

The predefined rules include the following.

1). If the client supports fingerprints, the client should send fingerprints. If the client does not support fingerprints, the client cannot send fingerprints.

2). If IDs of the client are invalid and the fingerprint algorithm is not unique, the client should not send fingerprints.

If the fingerprint algorithm is not unique, multiple different data items may correspond to the same fingerprint. If the IDs are invalid, the client is unable to be associated with the data items through the fingerprints. Therefore, at this time, it is meaningless to send fingerprints.

3). If the change log is valid, the client sends modified data items or fingerprints of the modified data items. If the change log is invalid, the client sends all data items or fingerprints of all the data items.

4). If the IDs are valid, the fingerprints and the IDs are used in pairs. If the IDs are invalid, only the fingerprints are sent.

5). If the IDs are invalid, the validity of the change log becomes meaningless. The client should send all data items or fingerprints of all the data items, instead of sending fingerprints of modified data.

At this time, even though the change log is valid, the client is still unable to identify which data items are changed accurately since the IDs are disordered, such that the client is only able to send all data items or fingerprints of all the data items.

6). The validity of the change log of the server does not influence the validity of the change log of the client. However, the validity of IDs of the server influences the validity of IDs of the client.

The server maintains a mapping table between LUIDs (IDs of data items on the client) and GUIDs (IDs of data items on the server), and thus if the mapping table at a server side is invalid, even the client sends the LUIDs, the server side is still unable to perform matching and identification accurately.

When the foregoing rules are used, the situations of combinations need to be taken into consideration, such as a combination of Rules 1 and 4, a combination of Rules 3 and 4. For example, for the combination of Rules 3 and 4, specifically, when the change log is valid and the IDs are valid, the client is instructed to send modified data items and corresponding IDs or fingerprints of modified data items and corresponding IDs. When the change log is valid and the IDs are invalid, the client is instructed to send all data items or fingerprints of all the data items. When the change log is invalid and the IDs are valid, the client is instructed to send all data items and corresponding IDs or fingerprints of all the data items and corresponding IDs. When the change log is invalid and the IDs are invalid, the client is instructed to send all the data items or the fingerprints of all the data items.

After the synchronization parameters are determined, the server instructs the client whether to send fingerprints and to send fingerprints of which data, for example, to send fingerprints of all the data items or fingerprints of the modified data items.

A message example is as follows.

```
<Status>
    <Cmd>SyncAlert</Cmd>
        <Data>200</Data> <!--Status code for OK-->
    ... ...
</Status>
```

The message represents that the server agrees the client to send synchronization parameters.

In step 1103, according to the instruction of the server, the client sends a PKG3 containing corresponding data fingerprints.

If the client sends fingerprints of modified data, it needs to be determined which data items are modified according to the change log, and fingerprint information of this part of data items is sent.

In partial synchronization, the client may also find data items in a specified directory from the change log and send fingerprints of modified data among this part of data. For example, the change log has three modified elements, namely, a LUID001, a LUID003, and a LUID005. However, only the LUID005 is in a directory to be synchronized, so the client only sends a fingerprint of the LUID005.

The fingerprint information is usually sent in pairs with IDs. If the IDs are invalid, the fingerprints may also be separately sent.

A message example is as follows.

```
<Put>
    <Item>
        <LUID> LUID004 </LUID> <FingerPrint> 2c8a357e </FingerPrint>
    </Item>
    ... ...
</Put>
```

It should be noted that the PKG1 and the PKG3 may be combined, and the PKG2 and the PKG4 may also be combined. That is, the client may also send fingerprints in the PKG1.

In step 1104, the server compares the received fingerprints, and instructs the client in the PKG4 the IDs or fingerprints of data items to be sent.

In this step, the server compares the stored or calculated fingerprints with the fingerprints sent by the client. If the fingerprints are the same, it indicates that the data items of the two parties are the same and the client does not need to send data items, that is to say, contents of the data items are the same. If the fingerprints are different, the server may determine whether the client needs to send data items according to a collision detection strategy. If the server wins through the collision detection strategy, the modification of the server is used and the client does not need to send data items. If the server does not win through the collision detection strategy, the client needs to send data items. After comparison, the server returns the IDs or fingerprints of data items that the client needs to be sent to the client through the PKG4. In this step, a function of fingerprints is the same as that of the data IDs. That is to say, the server instructs the client to send which data items by sending fingerprints in the PKG4.

A message example is as follows.

```
<RequiredID>
    <Item>
        <LUID> LUID004 </LUID>
    ...
    </Item>
    ... ...
</RequiredID>
```

In step 1105, the client sends the instructed data items to the server in the PKG5.

In this step, the client determines corresponding data according to the data IDs or fingerprints in the PKG4, and sends the determined data to the server in the PKG5.

It should be noted that for the unidirectional fingerprint generation, the corresponding fingerprints also need to be sent when complete data in the PKG5 is sent.

In step 1106, the server returns receiving status information to the client in a PKG6.

Optionally, the server may send modified data of the server to the client in the PKG6 for synchronization by the client.

In step 1107, the client returns statuses of received data in a PKG7, and sends a mapping command to the server.

In step 1108, the server returns status information of the mapping command to the client in a PKG8.

In the foregoing process, before the PKG1 is sent, the server delivers a notification message to the client, so as to indicate a synchronization direction and a synchronization behavior. The client initializes a synchronization session according to the indication information in the notification.

Optionally, in the PKG1, the client sends synchronization anchor information. The server determines success or failure of a previous session and session interruptions according to the synchronization anchor information.

Based on the foregoing embodiments, structures of a system for DS and a device for DS according to the present invention are provided in the following.

Figure 12:
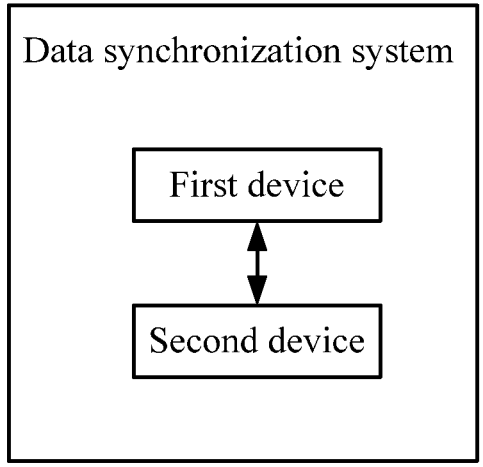
FIG. 12 is a structural block diagram of a system for DS according to an embodiment of the present invention.

FIG. 12 is a structural block diagram of a system for DS according to an embodiment of the present invention. As shown in FIG. 12, the system includes a first device and a second device in need of mutual DS.

The first device is adapted to send all data fingerprints and corresponding data IDs in its database to the second device, divide data that needs to be synchronized into data that needs to be synchronized due to modifications of the first device and data that needs to be synchronized due to the modifications of the second device according to a change log of its database after receiving IDs of data that needs to be synchronized sent by the second device, and send data that needs to be synchronized due to modifications of the first device and corresponding data IDs to the second device.

The second device is adapted to compare data fingerprints in its database with the received data fingerprints according to the received data IDs, determine data with inconsistent fingerprints as data that needs to be synchronized, send IDs of all data that needs to be synchronized to the first device, and synchronize the data that needs to be synchronized due to modifications of the first device received at the same time to its database according to the received data IDs.

In the system as shown in FIG. 12, if the first device and second device need bidirectional synchronization, the second device sends IDs of all data that needs to be synchronized to the first device and further sends the data that needs to be synchronized in its database to the first device at the same time. After dividing the data that needs to be synchronized into data that needs to be synchronized due to modifications of the first device and data that needs to be synchronized due to modifications of the second device, the first device is further adapted to synchronize the data that needs to be synchronized due to modifications of the second device in its database.

In the system as shown in FIG. 12, to reduce unnecessary data transmission processes, the two devices may first compare whether database fingerprints of the two parties are consistent, and the DS is not needed if consistent. Therefore, the second device may be further adapted to send its database fingerprint to the first device. The first device is further adapted to determine whether its database fingerprint and the database fingerprint of the second device are consistent, and send all data fingerprints in its database and corresponding data IDs to the second device when the database fingerprints are inconsistent.

In the system as shown in FIG. 12, the first device may be the client and the second device may be the server. Alternatively, the first device is the server and the second device is the client.

Figure 13:
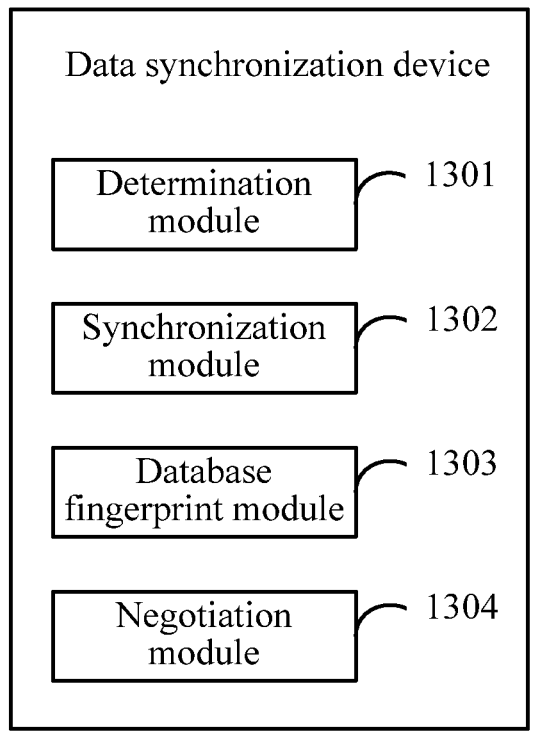
FIG. 13 is a structural block diagram of a device for DS according to a first embodiment of the present invention.

FIG. 13 is a structural block diagram of a device for DS according to a first embodiment of the present invention. As shown in FIG. 13, the device mainly includes a determination module 1301 and a synchronization module 1302.

The determination module 1301 is adapted to receive data fingerprints and corresponding data IDs sent by an opposite device, compare data fingerprints in its database with the received data fingerprints according to the received data IDs, determine data with inconsistent fingerprints as data that needs to be synchronized, and send IDs of all data that needs to be synchronized to the opposite device.

The synchronization module 1302 is adapted to receive data that needs to be synchronized due to modifications of the opposite device sent by the opposite device, and synchronize the received data in its database.

Here, the opposite device means a device in DS with the device for DS as shown in FIG. 13.

In FIG. 13, while the determination module 1301 sends IDs of all data that needs to be synchronized to the opposite device, the determination module 1301 is further adapted to send data that needs to be synchronized in its database to the opposite device at the same time.

The device for DS in FIG. 13 may further include a database fingerprint module 1303, which is adapted to send a database fingerprint of the device for DS to the opposite device, such that the opposite device determines whether to perform DS.

The device for DS in FIG. 13 may further include a negotiate module 1304, which is adapted to negotiate with the opposite device and determine a fingerprint generation mode.

The device in FIG. 13 may be a client or a server.

Figure 14:
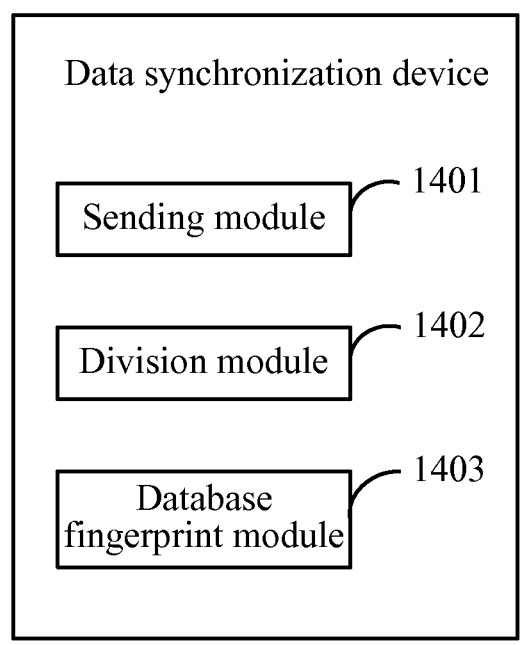
FIG. 14 is a structural block diagram of a device for DS according to a second embodiment of the present invention.

FIG. 14 is a structural block diagram of a device for DS according to a second embodiment of the present invention. As shown in FIG. 14, the device mainly includes a sending module 1401 and a division module 1402.

The sending module 1401 is adapted to send all data fingerprints in a database of the device for DS and corresponding data IDs to an opposite device.

The division module 1402 is adapted to receive IDs of data that needs to be synchronized sent by the opposite device, divide data that needs to be synchronized into data that needs to be synchronized due to modifications of its own device and data that needs to be synchronized due to modifications of the opposite device according to a change log a database in its own device, and send data that needs to be synchronized due to modifications of its own device and corresponding data IDs to the opposite device.

In FIG. 14, the division module 1402 may be further adapted to receive data that needs to be synchronized sent by the opposite device. After the data that needs to be synchronized is divided into data that needs to be synchronized due to modifications of its own device and data that needs to be synchronized due to modifications of the opposite device, the division module 1402 may be further adapted to synchronize the data that needs to be synchronized due to modifications of the opposite device in its own database.

The device for DS in FIG. 14 may further include a database fingerprint module 1403, which is adapted to receive a database fingerprint sent by the opposite device and determine whether to perform DS according to the received database fingerprint and a database fingerprint of its own device.

The device in FIG. 14 may be a client or a server.

In conclusion, in the embodiments of the present invention, the data that needs to be synchronized is determined by comparing data fingerprints in databases of two parties in need of DS. The DS is then performed on the data that needs to be synchronized. The technical solution uses the data fingerprints to implement DS, so as to avoid the process of determining the data that needs to be synchronized by transmitting a mass of data between the two parties in need of the DS. In addition, in the embodiments of the present invention, a plurality of methods for the two parties in need of the DS to negotiate a fingerprint generation mode and specific methods for comparing data fingerprints in the databases of the two parties are provided.

The above descriptions are merely specific embodiments of the present invention, but not intended to limit the scope of the present invention. Any modification, equivalent replacement, or improvement made without departing from the spirit and principle of the present invention should fall within the scope of the present invention.

What is claimed is:

1. A method performed by a server for data synchronization with a client, comprising:
    obtaining information of fingerprint characteristics, wherein the information of fingerprint characteristics comprises uniqueness information of a fingerprint algorithm which indicates whether fingerprints calculated with the fingerprint algorithm are unique;
    determining a fingerprint generation mode according to the information of fingerprint characteristics;
    receiving fingerprints sent by the client;
    if the fingerprint generation mode is unidirectional, comparing the fingerprints sent by the client and previously saved fingerprints generated by the client to determine data that needs to be synchronized;
    if the fingerprint generation mode is bidirectional, comparing the fingerprints sent by the client and fingerprints generated by the server to determine data that needs to be synchronized; and
    performing data synchronization on the data that needs to be synchronized.

2. The method according to claim 1, wherein the step of comparing the fingerprints to determine data that needs to be synchronized comprises:
    comparing fingerprints of each node in the databases of the two parties level by level from the fingerprints of root nodes in the databases, and stopping comparing fingerprints of lower-level nodes of a node when fingerprints of two parties of the node are consistent and the node is a root node or an intermediate node.

3. The method according to claim 2, wherein the steps of comparing fingerprints of each node in the databases and stopping comparing the fingerprints comprise:
    step A, determining whether the fingerprints of the root nodes in the databases of the two parties are consistent; if the fingerprints of the root nodes in the databases of the two parties are not consistent, performing step B; and if the fingerprints of the root nodes in the databases of the two parties are consistent, ending the process;
    step B, entering any lower-level node without fingerprint comparison and comparing whether fingerprints of the lower-level node are consistent: if fingerprints of the lower-level node are consistent, performing step E; and if fingerprints of the lower-level node are not consistent, performing step C;
    step C, determining whether the lower-level node is an intermediate node; if the lower-level node is an intermediate node performing step B; and if the lower-level node is not an intermediate node, performing step D;
    step D, determining data of the lower-level node is data that needs to be synchronized, and performing step E;
    step E, returning to an upper-level node and determining whether the upper-level node still has other lower-level nodes without fingerprint comparison; if the upper-level node still has other lower-level nodes without fingerprint comparison, performing step B; and if the upper-level node does not have other lower-level nodes without fingerprint comparison, performing step F; and
    step F, determining whether the upper-level node is a root node; if the upper-level node is a root node, ending the process; if the upper-level node is not a root node, performing step E.

4. The method according to claim 1, wherein the step of comparing the fingerprints to determine data that needs to be synchronized comprises:
    comparing fingerprints of each layer of nodes in the databases of the two parties layer by layer from the fingerprints of the root nodes in the databases, and stopping comparing fingerprints of a lower layer of nodes of a node when fingerprints of two parties of the node are consistent and the node is a root node or an intermediate node.

5. The method according to claim 4, wherein the steps of comparing the fingerprints of each layer of nodes in the databases and stopping comparing the fingerprints comprise:
    step a, determining whether the fingerprints of the root nodes in the databases of the two parties are consistent; if the fingerprints of the root nodes in the databases of the two parties are not consistent performing step b; and if the fingerprints of the root nodes in the databases of the two parties are consistent ending the process;
    step b, entering a lower layer of nodes;
    step c, comparing fingerprints of two parties of any node without fingerprint comparison among the lower layer of nodes, and determining whether the fingerprints of the two parties of the node are consistent; if the fingerprints of the two parties of the node are consistent, performing step e; and if the fingerprints of the two parties of the node are not consistent, performing step d;
    step d, recording the node as a node that needs to be synchronized, and performing step e;
    step e, determining whether the lower layer of nodes still has a node without fingerprint comparison; if the lower layer of nodes still has a node without fingerprint comparison, performing step c; and if the lower layer of nodes does not have a node without fingerprint comparison, performing step f; and
    step f, determining data of a leaf node among the recorded node is data that needs to be synchronized, and determining whether the recorded nodes include an intermediate node; if the recorded nodes include an intermediate node, entering a lower layer node of any intermediate node and performing step c; and if the recorded nodes do not include an intermediate node, ending the process.

* * * * *